June 8, 1965 D. W. G. BYATT 3,188,386
TELEVISION SCANNING SYSTEMS
Filed Aug. 20, 1962

INVENTOR
Dennis William George Byatt
BY
Baldwin & Wight
ATTORNEYS

United States Patent Office 3,188,386
Patented June 8, 1965

3,188,386
TELEVISION SCANNING SYSTEMS

Dennis William George Byatt, Great Baddow, England, assignor to The Marconi Company Limited, a British company Filed Aug. 20, 1962, Ser. No. 217,919
Claims priority, application Great Britain, Nov. 13, 1961, 40,500/61
4 Claims. (Cl. 178—6.8)

Figure 1:
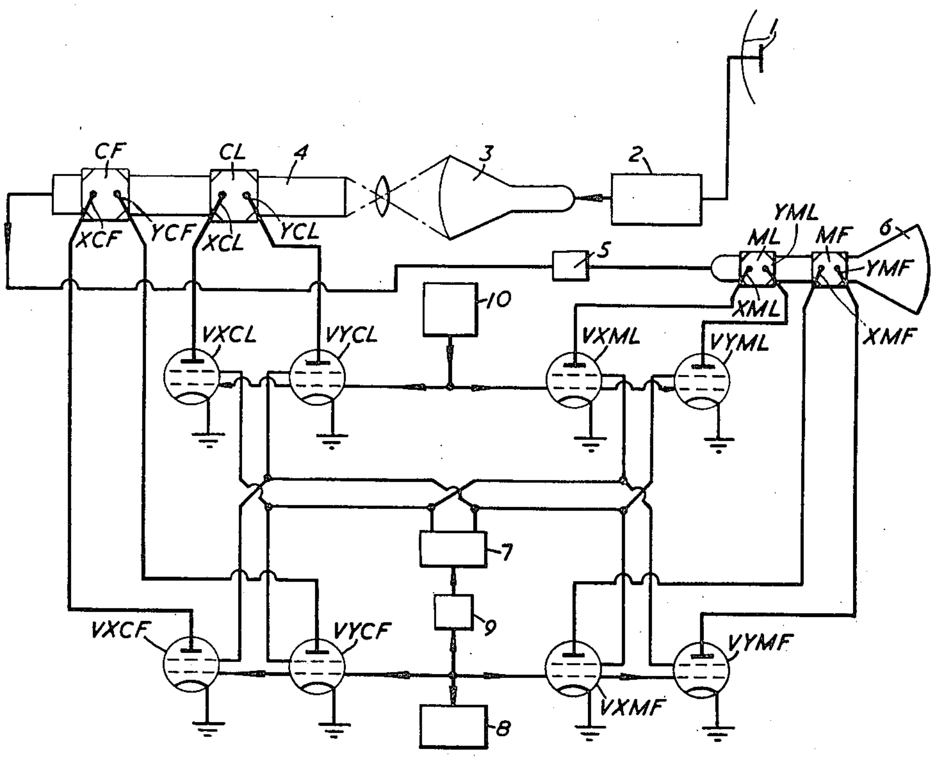

This invention relates to scanning systems for television transmitters and receivers. Though not limited to its application thereto the invention is particularly advantageously applicable to scanning conversion systems, such as are often used in radar, for converting a PPI (plan position indicator) store or display of signals into a television display.

In normal present day television scanning equipment scanning is effected in a series of parallel straight lines, the line direction running at right angles to the field or framing direction. In sequential scanning systems each picture is fully explored by the scanning lines in one field, the frame and field frequency being the same. In interlaced scanning systems each picture is fully explored by the scanning line in a plurality of successive fields, the lines of each field falling in spaces left between the lines of other fields. Interlaced systems as at present in general use are so-called double interlaced, the field frequency being twice the frame frequency, so that the picture is fully explored in two successive fields.

In all these known television systems the line structure is always present visibly in the reproduced pictures and, notwithstanding the numerous attempts which have been made to eliminate its presence, it always constitutes to some extent, a cause of dissatisfaction as to the quality of the said pictures. Especially is this so in scan conversion systems as often used in radar. In such systems the radar "picture" received, which is of the PPI type, is converted into a picture of the television type for viewing. In some radar equipments the received echo signals are stored in PPI fashion on the storage electrode of a so-called scan conversion cathode ray tube having a "writing" gun, the ray from which is deflected radially in synchronism with the range time-base of the radar equipment and rotated in synchronism with the radar aerial, and a "reading" gun which is deflected in mutually perpendicular line and field directions and thus picks off the stored signals in a television line scan for reproduction by a similarly and synchronously scanned reproducer or monitor cathode ray tube. In other radar equipments the echo signals are displayed by an ordinary PPI display tube which is "viewed" by a television camera tube, the ray in which is deflected in mutually perpendicular line and field directions in television fashion and produces video signals for similar and synchronous display, in television fashion, by a reproducer or monitor tube. In these and similar radar equipments the radar information is first available in PPI form, i.e. in a form in which the signals are stored or displayed by a cathode ray which radiates from a centre so that there is equal emphasis in both X and Y directions, whereas it is ultimately displayed (by the final monitor or reproducer tube) in a television line form in which the scan structure is essentially in the line (normally the X) direction. The line structure is therefore apt to be particularly marked in the ultimate display and this is obviously objectionable.

According to this invention, a television line scanning equipment comprises two line deflection systems for deflecting a scanning electron beam in two mutually perpendicular directions, two field deflection systems for deflecting the electron beam in the same mutually perpendicular directions, a line frequency deflection source or time base, an associated field frequency deflection source or time base, two line electronic switches connected, respectively, between the line frequency source and the two line deflection systems, two field electronic switches connected, respectively, between the field frequency source and the two field deflection systems, and means connected to said electronic switches and controlled by the field frequency source so as to alternate between first and second switching conditions at a whole number (including unity) of fields per second, said means alternately opening and closing the electronic switches, the arrangement being such that in the first switching condition only one of the line electronic switches and one of the field electronic switches are open, thereby allowing line and field deflections of the scanning electron beam in mutually perpendicular directions, and in the second switching condition only the other line and field electronic switches are open, thereby interchanging the directions of the line and field deflections.

Preferably, in a sequential scanning equipment in accordance with this invention alternation of the direction of the scanning lines is effected at field frequency whereby the scanning lines are in one direction during alternate fields and in the perpendicular direction during the remaining fields.

Preferably in an interlaced scanning equipment in accordance with this invention alternation of the direction of the scanning lines is effected at frame frequency whereby the scanning lines are in one direction during alternate frames and in the perpendicular direction during the remaining frames. Thus, in a double interlaced scanning equipment (where interlacing is employed, double interlacing—i.e. the use of two fields per frame—is customary) in accordance with this invention, the lines in the two successive fields in one frame will preferably be in one direction perpendicular to those in the two successive fields in the next frame.

Preferably the switching means are electronic and actuated by a switching frequency derived from the normally provided frame time base.

A preferred embodiment of the invention comprises mutually perpendicular line deflection coils, mutually perpendicular field deflecting coils, a line frequency time base, a field frequency time base, first and second switched circuits respectively between the line frequency source and the two line deflecting coils, third and fourth switched circuits respectively between the field frequency source and the two field deflecting coils and means controlled by said field source and operating at a whole number (including unit) of fields per second, for alternately closing the first and third switched circuits (leaving the second and fourth switched circuits open) and the second and fourth switched circuits (leaving the first and third switched circuits open).

Figure 2:
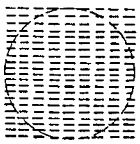
Figure 3:
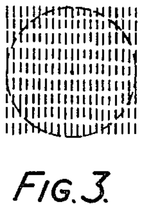
Figure 4:
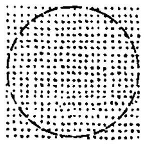

The invention is illustrated in and further explained in connection with the accompanying drawings in which FIGURE 1 is a diagram showing one form of the invention as applied to a radar station including a scan conversion system and FIGURES 2, 3 and 4 are explanatory figures illustrative of the nature of the display produced by the equipment of FIGURE 1.

Referring to FIGURE 1, the radar station therein represented comprises the usual azimuth scanning radar aerial system 1 connected to a radar transmitter-receiver 2 which displays received echo signals in customary PPI fashion on the screen of a display cathode ray tube 3. The apparatus so far described is only schematically indicated and is too well known to require further description. The PPI pictures on the screen of the tube 3 are "viewed" by a television camera tube 4 having a line deflection coil unit CL comprising mutually perpendicular coils and a field deflection coil unit CF also comprising mutually perpendicular coils. The connections to the X and Y deflecting coils in unit CL are indicated at XCL and YCL respectively and the connections to the X and Y deflecting coils in unit CF are indicated at XCF and YCF respectively.

The output signals from the camera tube are amplified by a video amplifier 5 and fed to a monitor or reproducer tube 6 having a line deflecting coil unit ML comprising mutually perpendicular coils and a frame deflection coil unit MF also comprising mutually perpendicular coils. The connections to the X and Y deflecting coils in unit ML are referenced XML and YML respectively and those to the X and Y coils in unit MF are referenced XMF and YMF respectively.

The feed circuits to the connections XCF, YCF, XCL, YCL, XML, YML, XMF and YMF are connected to the anodes of switch valves respectively referenced by the references VXCF, VYCF, VXCL, VYCL VXML, VYML, VXMF and VYMF. These valves are switched on by switching pulses applied to their outer grids from a bistable switching unit 7 which is controlled by a field frequency time base 8. If, as in the case assumed here, double interlacing is employed, the time base 8 controls the switching unit 7 through a divider 9 having a division factor of 2.

The field time base output from unit 8 is applied to the inner grids of valves VXCF, VYCF, VXMF and VYMF and output from the line frequency time base 10 is applied to the inner grids of valves VXCL, VYCL, VXML and VYML. The switching is effected by any convenient means known per se and in such manner that, in one condition of switching, valves VXCL, VYCF, VXML and VYMF are conductive together and the other valves are cut off, while in the other condition of switching, valves VYCL, VXCF, VYML and VXMF are the only valves in the conductive state. In one condition of switching (which condition holds for two successive interlaced fields constituting one frame) the scanning lines in the tubes 4 and 6 will be in one direction, as represented schematically in FIGURE 2, while in the other condition of switching, which holds for the next frame of two fields, the scanning lines will be in the perpendicular direction as similarly represented in FIGURE 3. The overall result is as schematically represented in FIGURE 4, the dots in which correspond to the crossing points of the lines in FIGURES 2 and 3. In this way, emphasis of a line structure in one direction is avoided.

The display tube 6 is preferably provided with a screen of sufficient afterglow to eliminate flicker in those cases in which the frame frequency is such that the frequency of alternate frames would be low enough to cause noticeable flicker effects if such afterglow were not provided. In a radar system as above described with reference to the drawings, the movement of radar targets will, in general, be too slow for such afterglow to cause false or misleading display.

I claim:

1. A television line scanning equipment comprising two line deflection systems for deflecting a scanning electron beam in two mutually perpendicular directions, two field deflection systems for deflecting said beam in said two mutually perpendicular directions, a line frequency source, a field frequency source, two line electronic switches connected respectively between the line frequency source and the two line deflection systems, two field electronic switches connected respectively between the field frequency source and the two field deflection systems, and means connected to the electronic switches and controlled by the field frequency source to alternate between a first and a second switching condition at a whole number of fields per second, said means alternately opening and closing the electronic switches so that in the first switching condition only one of the line switches and only one of the field switches are open, thereby allowing line and field deflections of said beam in mutually perpendicular directions, and in the second switching condition only the other line and field switches are open, thereby interchanging the directions of the line and field deflections.

2. A television line scanning equipment as claimed in claim 1, wherein each deflection system includes a deflection coil.

3. A radar system having a scanning conversion system for converting a PPI store or display of signals into a television display and comprising a television line scanning equipment as claimed in claim 1.

4. A radar system in which received echo signals are displayed in television form comprising a radar transmitter-receiver, an aerial system connected thereto, means for producing a PPI display of the echo signals appearing in the output of said transmitter-receiver, and scanning conversion means for converting said PPI display of signals into a television display, the latter means comprising two line deflection systems for deflecting a scanning electron beam in two mutually perpendicular directions, two field deflection systems for deflecting said beam in said two mutually perpendicular directions, a line frequency source, a field frequency source, two line electronic switches connected respectively between the line frequency source and the two line deflection systems, two field electronic switches connected respectively between the field frequency source and the two field deflection systems, and means connected to the electronic switches and controlled by the field frequency source to alternate between a first and a second switching condition at a whole number of fields per second, said means alternately opening and closing the electronic switches so that in the first switching condition only one of the line switches and only one of the field switches are open, thereby allowing line and field deflections of said beam in mutually perpendicular directions, and in the second switching condition only the other line and field switches are open, thereby interchanging the directions of the line and field deflections.

References Cited by the Examiner

FOREIGN PATENTS 1,028,162 4/58 Germany.

DAVID G. REDINBAUGH, *Primary Examiner.*